United States Patent [19]

Groves et al.

[11] 4,102,716

[45] Jul. 25, 1978

[54] TWO-PART REACTIVE DIELECTRIC FILLER COMPOSITION

[75] Inventors: James D. Groves, St. Paul, Minn.; Deborah Sue Anne D'Zuro, Overland Park, Kans.

[73] Assignee: Minnesota Mining and Manufacturing Company, Saint Paul, Minn.

[21] Appl. No.: 685,302

[22] Filed: May 11, 1976

[51] Int. Cl.$^2$ .......................... C08K 5/01; H01B 17/34
[52] U.S. Cl. ............................. 156/48; 352/51.5 R; 260/33.6 UB
[58] Field of Search ............ 260/77.5 AB, 77.5 AT, 260/858, 33.6 UB, 2.5 AT, 453 AL; 156/48, 49; 252/51.5 R

[56] References Cited

U.S. PATENT DOCUMENTS

| | | | |
|---|---|---|---|
| 3,194,773 | 7/1965 | Hostettler | 260/77.5 AB |
| 3,240,730 | 3/1966 | Hostettler et al. | 260/77.5 AB |
| 3,392,153 | 7/1968 | Hostettler et al. | 260/77.5 AB |
| 3,676,402 | 7/1972 | Matsui et al. | 260/77.5 AB |
| 3,714,110 | 1/1973 | Verdol et al. | 260/33.6 UB |
| 3,755,241 | 8/1973 | Brady et al. | 260/37 N |
| 3,764,457 | 9/1973 | Chang et al. | 260/858 |

*Primary Examiner*—Donald E. Czaja
*Assistant Examiner*—H. H. Fletcher
*Attorney, Agent, or Firm*—Cruzan Alexander; Donald M. Sell; Gerald F. Chernivec

[57] ABSTRACT

A two-part pourable composition capable of forming a dielectric, thermally stable, hydrolytically stable, moisture insensitive polyurethane gel comprising in a first part an aliphatic or cycloaliphatic isocyanate and an aliphatic/naphthenic hydrocarbon oil, and in a second part a polyalkadiene polyol, a dialkyl organotin catalyst, and the aliphatic/naphthenic oil. The gel is ideally suitable as a filler for communication cable splices since it is substantially inert toward molded polycarbonate connectors conventionally used in such splices.

7 Claims, No Drawings

TWO-PART REACTIVE DIELECTRIC FILLER COMPOSITION

BACKGROUND OF THE INVENTION

This invention relates to a reactive dielectric filler composition. More specifically, the invention relates to a two-part curable, dielectric composition having low initial viscosity, the composition being curable at ambient temperatures to thereby produce a thermally and hydrolytically stable, conformable, soft, moisture-insensitive gel.

The composition of the invention herein has particular utility in the area of cable splices and terminations, junction box fillings, and potting or encapsulation of electronic components. A particular utility for the composition involves the filling and protecting, in conjunction with a suitable closure, of unfilled or pertrolatum-polyethylene filled, reenterable of nonreenterable communication cable splices.

For obvious reasons, it is imperative that a cable splice or termination be maintained in as moisture-free an atmosphere as possible. Furthermore, in conjunction with buried cable splices, such splices are typically contacted by moisture, bacteria, and fungi found in the soil, whereby a filler or encapsulant utilized in conjunction with the splice must be resistant to the growth of such bacteria and fungi, as well as being moisture insensitive.

Presently, one common method for preparing reenterable splices is a hot-pour process, in which an amorphous or semi-crystalline polyolefin, bitumen, or paraffinic wax is heated to a pourable state, typically requiring high temperatures, and then poured into the splice closure. The disadvantages of such a process are obvious, namely the potential safety hazard, the difficulty of proper temperature control, and the possibility of subsequent cable insulation damage. Splice reentry is difficult and requires special tools, unless the splice closure is reheated in order to soften the encapsulant contained therein.

Another process for encapsulating a cable splice involves a composition such as a grease or low molecular weight polyolefin, e.g. polyethylene or polybutylene, which can be pumped into the splice closure with the aid of a caulking gun. In order to eliminate voids in the closure, skilled carftsmanship is necessary to insure that the conductor core bundle is thoroughly packed with the grease prior to the final pumping operation. Also, temperature fluctuations cause such compositions to flow and thereby form channels, which can serve as points of water ingress into the closure. Splice preparation and reentry are time consuming, temperature dependent, and extremely messy.

Another method utilizes a very fine, specially treated, hydrophobic powder, e.g., calcium carbonate, as a reenterable splice encapsulant. In this instance, splice preparation requires no mixing or special tools and can be undertaken independent of ambient temperature. However, in order to eliminate voids within the splice, skilled craftsmanship is required to insure a thorough compaction of the powder into the conductor core bundle. During splice preparation, there is a tendency for the powder to bridge small interstices within the core bundle, which can ultimately lead to void formation due to further powder compaction. In this instance, continuous positive pressure must be maintained on the closure to assure a water-tight seal. Again, the operations of splice preparation and reentry are extremely messy and may be somewhat hazardous from a health standpoint due to the small particle size of the powder utilized.

Still another method utilizes low density rigid polyurethane foams as a reenterable splice filler. In such an application, the conductor core bundle and conductors therein must be protected by a suitable covering from the foam, in order to provide reentry capability. This large central void increases the possibility of water ingress to the splice. Furthermore, foam density is temperature sensitive and it is thereby difficult to accurately determine the quantity of material necessary to fill the splice closure. In order to facilitate splice reentery, it is common to insert a rip-cord into the foam during splice preparation.

At present, one of the most common and presently acceptable methods of preparing reenterable communication cable splices is based on two-part, reactive, typically plasticized, low viscosity polyurethanes, which after mixing on site can be poured or injected into the splice closure, whereupon they cure to a semi-rigid gel possessing relatively low internal strength. These polyurethane systems, however, typically display less than optimum electrical properties. For example, initial insulation resistances of most of such systems have been determined to be in a relatively low range, typically from $10^8$ to $10^{10}$ ohms. Desirable insulation resistances for such materials should optimally be on the order of $10^{12}$ to $10^{14}$ ohms.

In addition, component parts within a splice to effectuate the conductor connections are typically manufactured from moled polycarbonate. While polycarbonate molded connectors provide excellent electrical characteristics, one disadvantage thereof is their susceptibility to cracking under the influence of tensile stress and/or strain in an environment, whether the environment be natural or artificial. Molded pieces of polycarbonate typically inherently contain areas of high stress which are known to absorb stress-cracking agents more rapidly than other simpler moled pieces. Stress cracking therein typically results in both swelling of the polycarbonate and crystallization of the amorphous polymer. Such stress cracking may decrease the electrical characteristics of the molded polycarbonate connector to the point where it is ineffective in the splice, thereby drastically reducing service life. To our knowledge, there is presently not available a communication cable splice reenterable encapsulant material which is substantially completely inert toward molded polycarbonate connectors.

It has now been found that all of the foregoing problems can be overcome by the use of a hereinafter defined two-part system capable of providing a cross-linked polyurethane in the form of a soft gel which is substantially compatible with polycarbonate connectors.

SUMMARY OF THE INVENTION

In accordance with the invention there is provided a two-part pourable reactive dielectric filler composition which is capable of providing a dielectric polyurethane gel upon reaction, one part of the composition comprising an aliphatic or cycloaliphatic isocyanate compound and an aliphatic/naphthenic hydrocarbon oil having less than about 35 percent by weight of aromatic groups therein, the other part comprising a polyalkadiene polyol, a dialkyl organo tin compound, preferably with a trialkyl tin oxide, as the catalyst system, and the aforementioned aliphatic/naphthenic hydrocarbon oil, the oil comprising about 5 to about 75 percent by weight of the total composition.

The two parts, upon mixing thereof, provide a clear gel upon curing, the gel having excellent physical and electrical properties, and being substantially inert toward molded polycarbonate connectors.

DETAILED DESCRIPTION OF THE INVENTION

The encapsulant useful herein can be described, in its cured state, as hydrocarbon-extended or plasticized polyurethane composition. The polyurethane useful herein is basically formed by the reaction of a hydroxyl-terminated alkadiene polymer or copolymer with specific organic isocyanates. Organic isocyanates having utility herein for the formation of the dielectric gel of the invention include aliphatic and cycloaliphatic isocyanates having at least two NCO groups per molecule. Exemplary of such isocyanates are dimer acid diisocyanate, derived from a $C_{36}$ dibasic acid; isophorone diisocyanate; trimethylhexamethylene diisocyanate; 4,4'-methylene-bis(cyclohexylisocyanate); etc., as well as mixtures of such isocyanates.

Hydrocarbon-extended polyurethanes based on aromatic isocyanates are disclosed and claimed in U.S. Pat. Nos. 3,755,241 and 3,714,110. However, aromatic isocyanates have been ascertained to have an adverse effect on polycarbonates, i.e. stress cracking and/or crazing of molded polycarbonate components occurs when such components are contacted with an aromatic-based system. Furthermore, most aromatic isocyanates are not compatible with the hereinafter defined aliphatic/naphthenic extender oils useful herein, as they tend to provide a moisture sensitive polyurethane and to foam during curing.

The polyalkadiene polyols useful in the invention herein are liquid or quasi-liquid polymers derived, for example, from the polymerization of butadiene, isoprene, or mixtures thereof, or copolymers derived from the random copolymerization of vinyl monomers, e.g. styrene and methyl styrene, with compounds such as butadiene. The preferred polymers and copolymers have, on the average, greater than 2.0 terminal hydroxyl groups per molecule, e.g. at least about 2.1, and can have as high as about 2.6, or even 3.0 terminal hydroxyl groups per molecule.

Further, hydrogenated derivatives of the polyalkadiene polymers, i.e. those having about 70 to about 95 percent hydrogenation, which are waxy solids, are also capable of providing useful dielectric gels herein, such materials possessing improved thermal and hydrolytic stability.

These polyalkadiene polyols should have an average equivalent weight, i.e. molecular weight of the polymer divided by the number of hydroxyl groups therein, of at least about 500. For maximum compatibility and optimum physical properties of the cured polyurethane composition, polyols having an average equivalent weight of about 1000 to about 2000 are preferred.

It has been determined that reactive polyether polyols and/or ricinoleate derivatives, e.g., castor oil and the like, are by themselves not sufficiently compatible at room temperature with the aliphatic/naphthenic extender oils useful herein and the polyalkadiene polyols to provide useful, clear, non-bleeding dielectric gels. However, up to about 20% by weight of the polyalkadiene polyol can be replaced by polyether polyols and/or ricinoleate derivatives, such as castor oil and the like, having about 2 to about 4 hydroxyl groups per molecule and an equivalent weight of from about 300 to about 1500, by a conventional pre-reaction mechanism with an aliphatic isocyanate to thereby form an isocyanate-terminated prepolymer, which when subsequently reacted with the polyalkadiene polyols produce a dielectric gel having the necessary properties.

Besides the polyalkadiene polyol and reactive polyether or castor oil-derived polyols, there can also be employed minor amounts, i.e. less than about 20% by weight of polyol portion, of compatible lower molecular weight, reactive, chain-extending or crosslinking compounds having molecular weights typically of about 300 or less, and containing therein about 2 to about 4 hydroxyl groups. Materials containing aromatic groups therein, such as N,N-bis(2-hydroxypropyl)aniline have seen found to be compatible and to thereby produce useful dielectric gels when used herein. Conversely, compounds such as ethylene glycol, 1,4-butanediol, trimethylol propane, and pentaerythritol have been found to be immiscible, and therefore incompatible, with the dielectric polymer and the aliphatic/naphthenic oils utilized herein.

The isocyanate should be present in a stoichiometric amount, i.e. in sufficient quantity to provide an NCO-/OH ratio of from about 0.9 to about 1.1.

The hydrocarbon extender oils useful herein for extending or plasticizing the polyurethanes of the invention include those having high paraffinic and/or naphthenic content and relatively low, i.e. less than about 35% by weight, aromatic groups therein.

It has been determined that hydrocarbon or petroleum oils having aromatic contents of greater than about 35% by weight adversely affect polycarbonate connectors utilized in cable splicing, by causing the aforementioned stress cracking and/or crazing phenomena in such connectors. Therefore, they are unacceptable for use in the invention.

Preferred hydrocarbon oils have an aromatic content of less than about 30% by weight and more preferably less than about 15% by weight. Preferred oils also have low viscosities, i.e. between about 30 and about 100 SSU at 210° F., because lower viscosity oils would provide better penetration of the pourable composition and would minimize the tendency for void formation. Furthermore, preferred oils have initial boiling points greater than about 550° F. to increase the thermal stability of the gel. Lower boiling oils would have correspondingly higher volatility, which would tend to reduce thermal stability.

Exemplary hydrocarbon oils found suitable for use herein are provided in the following Table I, together with their physical properties.

TABLE I

| | PROPERTIES OF EXTENDING OILS | | | | | | | | |
|---|---|---|---|---|---|---|---|---|---|
| OIL | A | B | C | D | E | F | G | H | I |
| VISCOSITY: | | | | | | | | | |
| SSU/100° F (37.8° C) | 429 | 255 | 103 | 212 | 58.6 | 508 | 110 | 495 | 1025 |
| SSU/210° F (99° C) | 53.1 | 49.5 | 39.5 | 44.9 | 34.4 | 64.3 | 40.3 | 57.0 | 69.0 |

TABLE I-continued

| | PROPERTIES OF EXTENDING OILS | | | | | | | | |
|---|---|---|---|---|---|---|---|---|---|
| OIL | A | B | C | D | E | F | G | H | I |
| SPECIFIC GRAVITY /60° F | 0.9015 | 0.8816 | 0.8644 | 0.9018 | 0.8718 | 0.8762 | 0.8591 | 0.8996 | 0.9129 |
| POUR POINT, °F | −20 | 20 | 10 | −25 | −65 | 0 | 0 | 0 | 0 |
| Initial Boiling Point | 710 | 720 | 642 | 630 | 550 | — | — | — | — |
| MOLECULAR ANALYSIS CLAY-GEL %Wt. | | | | | | | | | |
| Asphaltenes | 0 | 0 | 0 | 0 | 0 | 0 | 0 | 0 | 0 |
| Polar Compound | 0.2 | 0.2 | 0.2 | 1.6 | 0.4 | 0.5 | 0.3 | 0.6 | 1.0 |
| Aromatics | 13.2 | 17.5 | 12.1 | 27.6 | 8.2 | 15.8 | 11.9 | 19.3 | 21.5 |
| Saturates | 86.6 | 82.3 | 87.7 | 70.8 | 91.4 | 83.7 | 87.8 | 80.1 | 77.5 |
| CARBON ATOM ANALYSIS | | | | | | | | | |
| Aromatic, $C_A$ | 2 | 2 | 2 | 14 | 1 | 4 | 4 | 5 | 7 |
| Napthenic, $C_N$ | 44 | 40 | 36 | 32 | 46 | 27 | 29 | 39 | 41 |
| Paraffinic, $C_P$ | 54 | 58 | 62 | 54 | 53 | 69 | 67 | 56 | 52 |

A Through E are Shell Oil Co. Shellflex hydrocarbon oils
F and G are Sun Oil Co. Sunpar hydrocarbon oils
H and I are Sun Oil Co. Sunthene hydrocarbon oils The quantity of extender oil contained in the composition should be such as to provide a solids level therein of from about 25 to 95%, with from about 35 to about 50% solids being preferred. Decreasing solids levels, i.e. below about 25%, will tend to provide a cured product which will flow, which is of course undesirable. Increasing solids concentrations will tend to provide a tougher gelled product, as the plasticizing or extending effect of the oil will be reduced. Therefore, if reenterability is an important criteria, high solids loading should be avoided. For non-reenterable systems, this effect is of course not a problem.

An important feature which any dielectric filler composition must have is the capability to cure to its gel-like state at ambient temperatures within a splice closure in a reasonable period of time, i.e. less than about 2 hours. (Ambient temperatures herein contemplate a broad range of from about −7° to 35° C.) Typically, the choice of curing agent will dictate this gel or cure time.

It has been ascertained that catalysts or curing agents for the composition which will provide adequate cure times at ambient temperatures are generally those derived from the reaction of a carboxylic acid with a dialkyl tin oxide, in varying molar ratios. For example, when one mole of dialkyl tin oxide is reacted with two moles of a carboxylic acid in the presence of a small amount of alkaline material, dialkyl tin dicarboxylates are formed. These compounds may be reasonably represented by the formula:

$$R_2SnX_2$$

wherein R represents an alkyl group containing from about 1 to about 8 carbon atoms and X represents a carboxylic acid radical containing from about 1 to about 22 carbon atoms.

When one mole of dialkyl tin oxide is reacted with a single mole of a carboxylic acid, again in the presence of a small amount of alkaline material, an addition compound, commonly termed an Harada complex is formed. Although the precise structure of the complex is unknown, and there is at present no known commercial source available, preparation of the complex can be readily undertaken by methods detailed in U.S. Pat. Nos. 3,661,887 and 3,676,402.

Exemplary dialkyl tin dicarboxylates, which are commercially available, include dibutyl tin diacetate, dibutyl tin di(2-ethylhexanoate), dibutyl tin dilaurate, dibutyl tin diricinoleate, dibutyl tin dimaleate, dibutyl tin (bis-isooctylmaleate), etc.

Another class of dialkyl organo tin catalysts which are taught to be reactive with isocyanates, and considered useful herein, are disclosed in U.S. Pat. No. 3,828,007.

The total catalyst concentration requirements of course vary depending on the curing time desired for the dielectric gel. However, concentrations generally lie between about 0.1 and about 0.5 weight percent based on the polyol in the composition with from 0.5 to 1.0 weight percent being preferred. Increasing catalyst concentration of course reduces gel times.

A preferred catalyst system involves the addition of a trialkyl tin oxide in conjunction with the aforementioned carboxylates. Quite unexpectedly, it has been found that the concentration of the dialkyl tin dicarboxylate necessary to effectuate a desired gel time can be drastically reduced by the addition of a bis(tri-n-alkyl tin)oxide, a preferred example of which is bis(tri-n-butyl tin) oxide, commercially available as Bio M & T TBTO from the Metal & Thermite Co.

Furthermore, and again quite unexpectedly, it has been ascertained that the hydrolytic and thermal stability of the dielectric gels of the invention are considerably improved over gels catalyzed with either the dialkyl tin carboxylate or the bis(tri-n-alkyl tin)oxide separately.

The concentration ratio of the dialkyl tin dicarboxylates to the bis(tri-n-alkyl tin)oxide can be varied within rather wide limits. Generally speaking, the gel time decreases and the hydrolytic and thermal properties of the gel improve as this weight ratio decreases.

The reasons for this unexpected synergistic effect of bis(tri-n-alkyl tin)oxide on the catalytic activity of the dialkyl tin dicarboxylates as well as the improved hydrolytic and thermal properties of the resultant gel are not clearly understood.

However, the mechanism of a number of metal catalysts, for example ferric acetylacetonate, dibutyl tin dilaurate and cobalt (II) octoate, in aliphatic isocyanate-alcohol reactions was recently elucidated by A. E. Oberth and R. S. Bruenner in Ind. & Eng. Chem. Fund., 8(3) 383 (1969). In order to account for (1) the parabolic relationship between catalyst concentration and rate constant (i.e. a decrease in catalyst activity was observed with increasing concentration); and (2) the hyperbolic response of the rate constant to addition of small quantities of acetic acid (i.e. acetic acid decreased the rate of reaction), it was proposed that a partial alcoholysis of the metal catalyst was occurring, in this case a dialkyl tin dicarboxylate, to form free acid and an alkoxy-substituted metal salt.

The alkoxy-substituted metal salt then reacts with the isocyanate to form a complex which undergoes a rate determining rearrangement, forming the urethane.

It was established that bis(tri-n-alkyl tin) oxide is itself a catalyst for the reaction of this invention, although not preferred because it is not as active as the dialkyl tin dicarboxylates. Thus, in part the synergistic effect of bis(tri-n-alkyl tin) oxide can be attributed to its catalytic contribution. However, it is felt that its primary contribution lies in its role as an acid acceptor. It is well known that alkyl-substituted tin oxides react readily with carboxylic acids to form the corresponding alkyl tin carboxylates.

Further, it is known that dialkyl tin dicarboxylates contain trace amounts of unreacted carboxylic acid. It is thought the bis(tri-n-alkyl tin) oxide initially reacts with the excess acid, present in the dialkyl tin dicarboxylate catalyst, these acids normally inhibiting the rate of reaction.

During reaction, the bis(tri-n-alkyl tin) oxide also possesses the capability of reacting with any acid formed, pursuant the aforementioned proposed reaction sequence so that the overall rate of reaction is increased. Thus, it is observed that the concentration of the dialkyl tin dicarboxylate can be decreased in the presence of bis(tri-n-alkyl tin) oxide to affect a comparable cure rate.

The hydrolytic and thermal stability are also apparently enhanced by the ability of the bis(tri-n-alkyl tin) oxide to react with acidic moieties present. For example, in the presence of water the dialkyl tin dicarboxylate hydrolyze to form alkyl tin oxides and carboxylic acids. These acids accelerate the rate of hydrolytic degradation of polyurethanes. In the presence of the bis(tri-n-alkyl tin) oxides these acids are effectively removed, thus improving the polyurethane's hydrolytic stability. It is believed that the improved thermal stability also may be attributed in part to the removal of acidic impurities by the bis(tri-n-alkyl tin) oxide. Oxidative degradation of the polyurethane is typically inhibited by the addition of antioxidants thereto.

In addition to the preferred catalysts detailed above, it has been ascertained that dialkyl tin dimercaptides are also useful catalysts in the preparation of the dielectric gels, an example of which is dibutyl tin dilauryl mercaptide.

Typically, the composition is provided as a 2-part pourable liquid system, wherein the isocyanate or isocyanate-capped prepolymer is dissolved in a portion of the aliphatic/naphthenic oil to form one part of the reaction mixture, and the catalyst and polyol portion are dissolved in the remainder of the aliphatic/naphthenic oil to thereby form the second part of the system. At the time of use in the field, the two parts can be homogeneously mixed and simply poured into the splice closure.

The dielectric gel as hereinabove described overcomes the known disadvantages of the aforementioned prior art systems by requiring no heat, and therefore causing no burn hazard or possible cable insulation damage, requiring no special tools or encapsulated rip cord for splice reentry, and the gel is non-hazardous to health. Furthermore, the composition possesses clean tack. i.e. the gel is slightly sticky but does not transfer to the hands or other items coming in contact therewith, flexibility, excellent adhesion to the connector bundle and splice closure over a wide temperature range, thereby resulting in an extended operational lifetime of the splice, and clean, facile reenterability. The composition is pourable at temperatures approaching −20° F and also possesses a relatively temperature-independent viscosity, gel time, and density, thereby minimizing the time necessary for splice preparation and return of the spliced cable to service, especially at lower ambient temperatures. The composition furthermore possesses superior electrical properties over wide ranges of temperature and humidity and does not appreciably affect the physical properties or service life of metallic or nonmetallic materials with which the composition comes in contact. For example, the composition is not corrosive to copper or aluminum conductors.

The invention will now be more specifically described by the use of the following non-limiting examples, wherein all parts are by weight unless otherwise indicated.

EXAMPLE 1

A two-part reactive encapsulant composition was prepared by first mixing in a suitable vessel 15.49 parts of DDI-1410, tradename for a dimer acid diisocyanate commercially available from the General Mills Co., 2.46 parts of Irganox 1076, tradename for octadecyl bis(3,5-t-butyl-4-hydroxyphenyl) propionate, an antioxidant commercially available from the Ciba-Geigy Chemical Co., and 82.05 parts of Shellflex 371, tradename for an aliphatic/naphthenic oil commercially available from the Shell Oil Company. The viscosity of this portion at 25° C. was 205 centipoise.

The second part of the reactant composition was prepared by mixing 64.51 parts of Poly BD R-45HT, tradename for a hydroxyl-terminated polybutadiene having an equivalent weight of about 1358 and an average of from 2.0 to 2.5 hydroxyl groups per molecule and commercially available from the Arco Chemical Co., 0.96 part of Irganox 1076, 33.83 parts of Shellflex 371, and 0.7 part of M & T Catalyst T-8, tradename for dibutyl tin di (2-ethylhexanoate), commercially available from the Metal and Thermite Company. The viscosity of this portion at 25° C. was 2280 centipoise.

Conventional antioxidants, such as the Irganox 1076 are utilized to protect the composition from thermal and oxidative breakdown. If colored compositions are desired conventional dyes or pigments may be added to one or both parts.

The two parts were mixed on a 1:1 by weight basis, and the viscosity of the mixture at 25° C., prior to curing, was 1100 centipoise. This composition was labeled as Composition A.

A second composition was prepared exactly as Composition A with the exception that the 0.7 part of catalyst T-8 was replaced with 1.0 part of Bio M & T TBTO, tradename for bis(tri-n-butyl tin) oxide available from the Metal & Thermite Co. This composition was labeled as Composition B.

A third composition was prepared exactly as Composition A with the exception that catalyst T-8 concentration was reduced from 0.7 part to 0.1 part and 0.2 part of TBTO was added, the composition being labeled as Composition C.

To determine the gel time of the mixtures, a Sunshine gel meter was utilized, which is commercially available from Sunshine Scientific Instruments. This meter essentially consists of a driving motor and a rotating spindle, with a torsion spring coupling the driving motor to the spindle, the spindle then being suspended in the composition sample. The sample is typically maintained at any desired temperature by utilizing a constant temperature bath surrounding the sample cell. At the gel point of the composition, the very pronounced increase in viscosity of the sample stops the rotating spindle, thereby closing an electric circuit which actuates the timing and alarm circuit of the gel meter. Utilizing a 100 gram mass of sample in the meter, the gel time of Composition A was determined to be 81 minutes at a sample temperature of −7° C., and at 25° C. the gel time was 18 minutes. The maximum exotherm of the reaction was determined to be 33° C. Similarly, the gel times of Compositions B and C were determined to be 19.0 and 18.3 minutes, respectively, at 25° C., with the maximum exotherms for both being 33° C.

In their cured states, the polyurethane gels were of light yellow color, transparent, conformable, soft and possessed clean tack, i.e. the gel material felt tacky to the touch but did not transfer to the fingers.

The dielectric strength of the gel, determined per ASTM specification D149 was 1500 volts per mil. The dielectric constant and dissipation factor, determined per ASTM D150 were 2.6 and 0.0001, respectively. The insulation resistance, i.e. the resistance to conduct electrical current, determined per Western Electric Specification AT-8612 was $10^{14}$ ohms. A sample of the cured composition was conditioned, per AT-8612 in a 40° C. 96% relative humidity atmosphere for 28 days, following which the insulation resistance remained at $10^{14}$ ohms.

After equilibrating at room temperature for four days, the heat aging characteristics of the three compositions, measured with respect to weight loss and hardness change on two 1 inch × 2 inch × ¾ inch samples of each composition were tested. The hardness of each sample was determined by a grease penetrometer (¼ cone) according to ASTM D-1403 and found to average 18, 23 and 18 respectively for the three gels A, B, and C. All samples were then weighed and placed in an air circulating oven at 95° C. for 30 days. The samples were allowed to equilibrate to room temperature (25° C.) for six hours, weighed and their final hardness measured. The percentage weight loss for A, B, and C gels averaged 9.2, 8.6 and 8.5 respectively. The final average penetrometer readings were 28, 30 and 16. From these results it was apparent that the thermal stability of composition C utilizing both T-8 and TBTO was superior to either compositions A or B utilizing T-8 and TBTO alone.

The hydrolytic stability of gels A, B and C were determined by measuring weight loss and hardness change in a manner exactly as above, except that the samples were placed in water at 95° C. for 30 days. The initial penetrometer readings again averaged 18, 23 and 18 respectively for gels A, B, and C. The samples were allowed to equilibrate to room temperature for six hours, weighed and their final hardness measured. The percentage weight change of gel A and gel C was −0.20 and −0.18 respectively. The weight change of the gel B could not be determined because of hydrolytic degradation. The final average penetrometer readings were 68, N.D. (>110) and 30 respectively for the gels A, B and C. From these results it was obvious that the hydrolytic stability of composition C, utilizing both T-8 and TBTO was vastly superior to either compositions A or B utilizing T-8 and TBTO alone.

The fungus resistance of the materials, when tested pursuant to ASTM G-21-70 produced no growth.

To determine the corrosivity of the compositions towards copper, pursuant the aforementioned Western Electric Specification AT-8612, the copper pattern of a printed circuit test pattern, a 1.75 inch by 2.37 inch pattern, was cleaned by immersion thereof into a mixture of 1 part by weight of FFF grade pumice and 10 parts by weight of water followed by brushing with a nylon bristle handbrush. The test pattern was rinsed with water and isopropyl alcohol and blown dry with oil-free compressed air. The mixed composition A of Example 1, prior to curing, was coated on the pattern approximately ½ inch wide and allowed to cure for 48 hours. The thus coated test pattern was then suspended in a 95% relative humidity atmosphere at 35° C., and a DC voltage of 45 volts was applied to the test pattern for a period of 30 days. At the end of the test period, the pattern was visually inspected for evidence of corrosion or discoloration of the copper under the strip coated with the dielectric composition. It was determined that no corrosive action was evidence on the copper coated with the composition.

Composition A was then tested relative to its compatibility with high density polyethylene, commonly utilized as conductor insulation in petrolatum-polyethylene filled communication cables and also in some types of aircore communication cables, and low density polyethylene, commonly utilized in communication cable jacketing. Relative to the high density polyethylene, 6 segments, each 6 inches in length, of each of the 10 common colored insulated conductors were encapsulated in gel A, followed by conditioning for 30 days at 80° C. Following the conditioning period, each insulated conductor segment was placed in a horizontal position on a flat surface and the top layer of insulation was sliced off by pushing a new clean razor blade forward in a continuous uninterrupted motion over the copper conductor. If the cut of the blade could not be made in one uninterrupted motion, the sample was discarded, because obviously the surface then had a nick in it and therefore a continuous surface was not presented. As a control, the same procedure was followed for 6 segments of each of the 10 colored insulated conductors, of 6 inches in length, which had not been conditioned in the dielectric gel.

The tensile strength and percent elongations were determined on all samples in accordance with ASTM D 412. All results were averaged and are illustrated below.

TABLE II

EFFECT OF DIELECTRIC GEL ON HIGH DENSITY POLYETHYLENE
(80° C. for 30 days)

| | Tensile Strength (pounds per sq. inch) | % Change | Percent Elongation | % Change |
|---|---|---|---|---|
| Control | 3739 | | 920 | |
| Aged in Gel | 3405 | −9 | 827 | −10 |

For low density polyethylene compatibility determinations, 8 tensile specimens were cut from the outer jacketing of a cable manufacturing by the General Cable Company, encapsulated in gel A and conditioned for 30 days at 70° C. The specimens were tested in accordance with ASTM D 412, and the results averaged as indicated in Table III. Again, as a control, 8 samples were tested which were not conditioned with the dielectric gel.

TABLE III
EFFECT OF DIELECTRIC GEL ON LOW DENSITY POLYETHYLENE
(70° C. for 30 days)

| | Tensile Strength $T_B$ (pounds per sq. inch) | % Change | Percent Elongation $E_B$ | % Change |
|---|---|---|---|---|
| Control | 1767 | | 1034 | |
| Aged in Gel | 1712 | −3 | 1079 | +4 |

From the above tests, it was concluded that dielectric gel A of Example 1 did not adversely affect either high or low density polyethylene.

As aforementioned, the combination of certain environments and tensile stresses or strains may cause stress cracking or crazing of molded polycarbonate connectors typically used to splice communication conductors. A stress crack is defined as a localized failure, whereupon a stress craze is an area of localized yield.

Compatibility of a composition with the polycarbonate is considered to mean that the composition will not cause a decrease in the properties of the polycarbonate material. There is no standard ASTM test method presently available for measuring the effect of various environments on various tensile stress levels of polycarbonate. However, there is wide agreement among polycarbonate manufacturers that to be deemed compatible, no crack or craze may be observed when a polycarbonate test specimen is stressed to 2000 lbs. per square inch and exposed to an environment for at least 5 days at at least 73° F. and 5 days at 120° F. and when stressed to 1700 lbs. per square inch for 3 days at 158° F. and 3 days at 185° F.

To prepare polycarbonate test specimens, a clear, dry polycarbonate having a melt flow of from 6 to 12 grams per ten minutes was injection molded into bars of 5 inches by 0.5 inch by 0.125 inch thickness. The bars were cut in half to thereby provide test specimens of 2.5 inches by 0.5 inch by 0.125 inch, and then heated in an oven at 120° C. for 24 hours in order to yield the specimen, following which they were allowed to cool to room temperature.

The polycarbonate samples were then placed in a 3 point bending fixture, in which the specimens were supported at the ends to thereby provide a 2 inch span therebetween, and were then stressed to 3000 pounds per square inch outer fiber stress, determined by carefully measuring the deflection at the center of the sample with a dial micrometer. The relationship between deflection and outer-fiber stress can be conveniently expressed by the following formula:

$$f = 6DEd/L^2$$

wherein $f$ is the fiber stress in pounds per square inch, D is the deflection in inches, E is the modulus of elasticity in flexure, pounds per square inch, $d$ is specimen thickness in inches, and L is span length in inches.

Six stressed test specimens were then encapsulated in dielectric gel A and allowed to cure at room temperature for 48 hours. The encapsulated specimens were then placed in a circulating air oven at 95° C. for a period of 30 days, followed by cooling to room temperature. The test specimens were then removed from the dielectric gel, cleaned with heptane, and examined under 30x magnification and a white light. There was no evidence of stress crazing or cracking on the surface or within the clear test specimens.

To assess the merits of composition A under field conditions, the components were mixed and poured into splice closure bodies to serve as a reenterable insulation filler. The splices successfully passed all of the environmental and electrical tests required of REA specification PE-70 of Mar. 4, 1971, entitled "Encapsulations, Splice Closures and Pressure Blocks." This specification covers all cable pressure blocks and/or splice closures intended for the purpose of controlling air flow or preventing moisture entrance or travel in plastic-insulated, plastic-jacketed REA approved cables.

EXAMPLES 2-4

The following Table illustrates the synergistic effect of bis(tri-n-butyltin)oxide (TBTO) on the activity of representative, commercially available dialkyltin dicarboxylates.

TABLE IV

| Weight % in Polyol of Example 1 | | Gel Time (min.) |
|---|---|---|
| M & T Catalyst T-1, a Dibutyl Tin Diacetate | TBTO | |
| 0.1 | — | 46.8 |
| 0.4 | — | 16.4 |
| 0.6 | — | 13.5 |
| 0.1 | 0.2 | 12.3 |
| 0.2 | 0.2 | 12.0 |
| 0.4 | 0.2 | 11.5 |
| M & T Catalyst T-12, a Dibutyl Tin Dilaurate | | |
| 0.5 | — | 26.4 |
| 1.0 | — | 17.6 |
| 0.5 | 0.2 | 13.6 |
| 1.0 | 0.2 | 13.3 |
| M & T Thermolite T-12, a Dibutyl Tin Diricinoleate | | |
| 0.5 | — | 24.2 |
| 1.0 | — | 17.8 |
| 0.5 | 0.2 | 13.6 |
| 1.0 | 0.2 | 12.6 |

EXAMPLES 5-6

As representative of the improvements in hydrolytic and thermal stability obtained when TBTO is utilized with the dialkyltin dicarboxylate catalysts in general, two compositions were prepared as per Composition A of Example 1. In one, the T-8 catalyst was replaced with 0.4 parts of dibutyl tin diacetate (M & T Catalyst T-1) and in the other with 0.1 parts of dibutyl tin diacetate and 0.2 parts of TBTO. See Table V below.

TABLE V

Thermal Stability of Cured Samples (95° C./30 days)

| Catalyst | Percent Weight Change | Penetrometer Readings Initial | Penetrometer Readings Final |
|---|---|---|---|
| M & T Catalyst T-1 alone | 9.66 | 17 | 25 |
| M & T Catalyst T-1 and TBTO | 9.3 | 17 | 15 |

Hydrolytic Stability of Cured Samples (95° C H₂O/30 days)

| Catalyst | Percent Weight Change | Penetrometer Readings Initial | Penetrometer Readings Final |
|---|---|---|---|
| M & T Catalyst T-1 alone | +0.15 | 17 | 94 |
| M & T Catalyst T-1 and TBTO | −0.02 | 17 | 42 |

EXAMPLES 7–8

Two compositions similar to composition A of Example 1 were prepared, except that in one the T-8 catalyst was replaced with 1.0 part of dibutyl tin diricinoleate (Thermolite-12) and in the other with 0.1 parts of Thermolite-12 and 0.2 parts of TBTO. Results are shown in Table VI.

TABLE VI

Thermal Stability of Cured Samples (95° C./30 days)

| Catalyst | Percent Weight Change | Penetrometer Readings Initial | Final |
|---|---|---|---|
| Thermolite 12 alone | −7.5 | 16 | 22 |
| Thermolite 12 with TBTO | −9.6 | 16 | 14 |

Hydrolytic Stability of Cured Samples (95° C H$_2$O/30 days)

| Catalyst | Percent Weight Change | Penetrometer Readings Initial | Final |
|---|---|---|---|
| Thermolite 12 alone | +0.01 | 16 | 77 |
| Thermolite 12 with TBTO | −0.11 | 16 | 29 |

EXAMPLE 9

The procedure of Example 1 was repeated with the exception that the dimer acid diisocyanate was replaced with isophorone diisocyanate. Therefore, a first portion was prepared by mixing 7.0 parts of isophorone diisocyanate and 93.0 parts of Shellflex 371. A second portion was prepared by mixing 73.0 grams of poly BD R-45HT, 25.0 grams of Shellflex 371, 2.0 grams of Irganox 1076 and 2.0 grams of dibutyl tin di(2-ethylhexanoate). Upon homogeneous mixing of the two parts on a 1:1 weight basis, the sample gelled in 143 minutes at 25° C. to a rather tough clear gel, comparable in properties to that of gel A of Example 1.

EXAMPLE 10

The procedure of Example 1 was repeated utilizing trimethylhexamethylene diisocyanate. A first portion was prepared by mixing 6.4 parts of trimethylhexamethylene diisocyanate in 93.6 parts of Shellflex 371, and a second portion was prepared by mixing 73.6 parts of poly-BD R-45HT with 24.4 parts of Shellflex 371, 2.0 parts of Irganox 1076, and 3.0 parts of dibutyl tin di(2-ethylhexanoate).

Upon homogeneous mixing on a 1:1 weight basis, the sample gelled in 44.7 minutes at 25° C. to provide a tough, clear gel comparable in properties to gel A of Example 1.

EXAMPLE 11

A two part curable system was prepared by mixing, as a first portion, 7.8 parts of Hylene W, tradename for 4,4'-methylene bis(cyclohexylisocyanate) commercially available from the DuPont Company with 92.2 parts of Shellflex 371. A second portion was prepared by mixing 72.2 parts of Poly BD R-45HT with 25.8 parts of Shellflex 371, 2.0 parts of Irganox 1076, and 3.0 parts of T-8 catalyst. Upon intimate mixing of the two part system on a 1:1 weight basis, the composition cured in 33 minutes at 25° C. to provide a tough, clear gel comparable in properties to gel A of Example 1.

EXAMPLE 12

A two part system was prepared by mixing in one vessel, as the first portion, 14.38 parts of dimer acid diisocyanate, 2.46 parts of Irganox 1076, and 83.16 parts of Shellflex 371. In a second container, there were mixed 65.62 parts of hydrogenated Poly BD R-45HT, which is a hydroxyl-terminated polybutadiene which had been hydrogenated to about 75 percent of theoretical to provide a hydroxyl-terminated polyol having an equivalent weight of about 1360 and an average of 2.0 to 2.5 hydroxyl groups per molecule, supplied by the Arco Chemical Company, together with 1.0 parts of Irganox 1076, 32.72 parts of Shellflex 371, and 0.7 parts of the T-8 catalyst of Example 1.

The composition, after intimate mixing of the two parts, on a 1:1 weight basis, cured in 9.1 minutes at 25° C. to a rather tough, opaque gel, which possessed improved hydrolytic and thermal stability, apparently because of the saturation of the polyol, over gel A of Example 1.

EXAMPLE 13

A two part curable system was prepared by first mixing in one vessel 16.65 parts of dimer acid diisocyanate, 2.46 parts of Irganox 1076, and 80.89 parts of Shellflex 371. In a second vessel were mixed 86.58 parts of Poly BD CS-15, tradename for a 75/25 weight percent butadiene/styrene copolymer, having a hydroxyl number of 36.5 and an equivalent weight of 1532, commercially available from the Arco Chemical Company, together with 1.0 parts of Irganox 1076, 34.0 parts of Shellflex 371, and 0.7 parts of T-8 catalyst.

Upon intimate mixing of the two portions, gellation occurred in 24.0 minutes at 25° C. to provide a clear, tough gel comparable in properties to gel A of Example 1.

EXAMPLE 14

An isocyanate-capped prepolymer was prepared by adding 9.6 parts of DB grade castor oil, which is a castor oil of about 340 equivalent weight, commercially available from the National Lead Company, with 236.4 parts of Shellflex 371, followed by heating the mixture to 100° C. for one hour under a vacuum of 5 millimeters of mercury. Following breaking of the vacuum, 54.0 parts of dimer acid diisocyanate were added rapidly to the mixture. Upon thorough mixing, the composition was heated at atmospheric pressure at 100° C. for 24 hours, followed by cooling to room temperature.

The second or polyol portion of the polyurethane system was prepared by mixing 176.4 parts of Poly BD R-45HT with 6.0 grams of Irganox 1076, 116.7 grams of Shellflex 371, and 2.1 grams of catalyst T-8.

Upon thoroughly mixing equal parts by weight of the two portions, a 100 gram sample cured in 12.9 minutes at 25° C. to provide a clear, tough gel again comparable to gel A of Example 1.

EXAMPLE 15

An isocyanate-capped prepolymer was prepared by heating 78.9 parts of Shellflex 371 and 4.6 parts of Niax LG-56, a polyoxypropylene triol of 1000 molecular weight, commercially available from the Union Carbide Company, to 95° to 100° C. for one hour under a vacuum of 5 millimeters of mercury. Upon breaking the vacuum, 16.5 parts of dimer acid diisocyanate were added rapidly to the mixture. The mixture was allowed to stir at 100° C. for 24 hours, following which it was cooled to room temperature.

A polyol component was prepared by mixing 58.8 parts of Poly BD R-45HT, 2.0 parts of Irganox 1076, 38.9 parts of Shellflex 371, and 0.7 parts of catalyst T-8.

Upon mixing equal parts by weight of the two components to provide a 100 gram sample, the mixture cured in 19.2 minutes at 25° C. to provide a clear, tough gel, again comparable to gel A of Example 1.

EXAMPLE 16

Example 1 was repeated with the exception that Sunthene 250, tradename for a naphthenic oil was substituted for Shellflex 371. This oil is comparatively balanced with respect to the naphthenic and paraffinic concentration therein. A gel formed therewith was comparable to gel A of Example 1.

EXAMPLE 17

Example 1 was repeated with the exception that Sunpar 150, a naphthenic/aliphatic oil was substituted for the Shellflex 371.

Upon curing a 1:1 by weight mixture of the components, a tough gel was prepared which was slightly hazy, with some bleeding noted, but still capable of providing the electrical properties of gel A of Example 1.

EXAMPLE 18

The preparation of gel A of Example 1 was repeated with the exception that the catalyst concentration contained therein was varied to provide an indication of the potlife of the dielectric composition. At a T-8 catalyst concentration of 0.20 weight percent based on the polyol, a gel time of 48.5 minutes was observed; at 0.40 weight percent, a gel time of 29.8 minutes was observed; at 0.50 weight percent, a gel time of 20.1 minutes was observed; at 0.70 weight percent, 17.6 minutes gel time was observed; at 0.80 weight percent, 16.0 minutes were observed; at 1.00 weight percent, 13.9 minutes; and at 1.20 weight percent 12.5 minutes.

EXAMPLES 19-21

The catalyst of gel A of Example 1 was substituted with the following concentrations and catalysts, whereupon the gel times were recorded as indicated.

| CATALYST | WEIGHT PERCENT BASED ON POLYOL | GEL TIME (MIN AT 25° C.) |
| --- | --- | --- |
| Stabilizer T-12, tradename for dibutyl tin bis(isooctylmaleate) commercially available from the Metal and Thermite Company | 1.0<br>5.0 | 16.4<br>10.0 |
| Markure UL-2, believed to be predominantly dibutyl tin maleate, commercially available from the Argus Chemical Company | 1.0<br>5.0 | 18.6<br>10.6 |
| Markure UL-1, believed to be dibutyl tin dilauryl mercaptide, commercially available from the Argus Chemical Company | 1.0<br>5.0 | 16.0<br>10.6 |

EXAMPLE 22

A Harada complex was prepared by reacting dibutyltin oxide and oleic acid in accordance with U.S. Pat. No. 3,661,887. Following preparation of the complex, the preparation of composition A of Example 1 was repeated with the exception that the complex was substituted for the T-8 catalyst, utilizing 1.0 weight percent thereof based on polyol.

After mixing equal parts by weight of the two components, the composition gelled in 8.1 minutes at 25° C. to provide a clear, rather tough dielectric gel having properties similar to gel A of Example 1.

EXAMPLE 23

A Harada complex was prepared from lauric acid and dibutyl tin oxide and substituted for that of Example 22 to provide a gel which cured in 7.8 minutes at 25° C.

What is claimed is:

1. A dielectric, thermally stable, hydrolytically stable, moisture-insensitive polyurethane gel comprising the reaction product of an admixture of:
   (a) at least one isocyanate compound having at least about 2.0 NCO groups per molecule and selected from the group consisting of aliphatic and cycloaliphatic isocyanate compounds;
   (b) a polyalkadiene polyol having an average equivalent weight of at least about 500 and containing at least about 2.0 terminal hydroxyl groups per molecule;
   (c) a hydrocarbon extender oil having less than about 35 percent by weight aromatic groups therein, said oil comprising about 5 to 75 percent by weight of said admixture; and
   (d) a catalyst comprising a dialkyl organotin compound and a trialkyl tin oxide; wherein said isocyanate compound is present in sufficient quantity to provide an NCO/OH ratio of from about 0.9 to 1.1 in said admixture.

2. The gel of claim 1 wherein said dialkyl organotin compound is the reaction product of a carboxylic acid with a dialkyl tin oxide.

3. The gel of claim 2 wherein said reaction product is a dialkyl tin dicarboxylate.

4. A process for filling a polycarbonate connector-containing communication cable splice closure comprising pouring into said closure, at ambient temperature, an admixture of:
   (a) at least one isocyanate compound having at least about 2.0 NCO groups per molecule and selected from the group consisting of aliphatic and cycloaliphatic isocyanate compounds wherein said isocyanate compound is present in sufficient quantity to provide an NCO/OH ratio of from about 0.9 to about 1.1 in said admixture;
   (b) a polyalkadiene polyol having an average equivalent weight of at least about 500 and containing at least about 2.0 terminal hydroxyl groups per molecule;
   (c) a hydrocarbon extender oil having less than about 35 percent by weight aromatic groups therein, said oil comprising about 5 to 75 percent by weight of said admixture; and
   (d) a catalyst comprising a dialkyl organotin compound and a trialkyl tin oxide; and allowing said admixture to react to form a thermally and hydrolytically stable moisture-insensitive polyurethane gel, said gel being substantially inert toward said polycarbonate connector.

5. A communication cable splice closure filled per the process of claim 4.

6. The process of claim 4 wherein said dialkyl organotin compound is the reaction product of a carboxylic acid with a dialkyl tin oxide.

7. The process of claim 6 wherein said reaction product is a dialkyl tin dicarboxylate.

* * * * *